United States Patent
Arbour, Jr. et al.

(10) Patent No.: US 9,207,766 B1
(45) Date of Patent: Dec. 8, 2015

(54) METHOD AND APPARATUS FOR HAND IMAGING DEVICE

(75) Inventors: Richard C. Arbour, Jr., Conifer, CO (US); Damon K. Fleming, Denver, CO (US)

(73) Assignee: Cyber Silence Technologies, Inc., Conifer, CO (US)

( * ) Notice: Subject to any disclaimer, the term of this patent is extended or adjusted under 35 U.S.C. 154(b) by 347 days.

(21) Appl. No.: 12/657,592

(22) Filed: Jan. 25, 2010

Related U.S. Application Data

(60) Provisional application No. 61/206,492, filed on Jan. 30, 2009.

(51) Int. Cl.
*G06F 3/01* (2006.01)
*G06K 9/00* (2006.01)

(52) U.S. Cl.
CPC ............ *G06F 3/017* (2013.01); *G06K 9/00335* (2013.01); *G06T 2207/30196* (2013.01)

(58) Field of Classification Search
USPC .......................................................... 382/115
See application file for complete search history.

(56) References Cited

U.S. PATENT DOCUMENTS

| | | | |
|---|---|---|---|
| 6,038,334 A | 3/2000 | Hamid | |
| 6,256,737 B1 | 7/2001 | Bianco et al. | |
| 6,421,453 B1 * | 7/2002 | Kanevsky ............. | G06F 21/316 340/5.2 |
| 6,819,782 B1 * | 11/2004 | Imagawa ........... | G06K 9/00355 382/115 |
| 7,258,279 B2 | 8/2007 | Schneider et al. | |
| 7,308,112 B2 | 12/2007 | Fujimura et al. | |
| 7,365,736 B2 | 4/2008 | Marvit et al. | |
| 7,394,346 B2 | 7/2008 | Bodin | |
| 8,135,181 B2 * | 3/2012 | Zhang et al. ................... | 382/115 |
| 2004/0017934 A1 * | 1/2004 | Kocher .......................... | 382/125 |

(Continued)

OTHER PUBLICATIONS

Robert K. Rowe, et al.; A Multispectral Whole-Hand Biometric Authentication System.

(Continued)

*Primary Examiner* — Kim Vu
*Assistant Examiner* — Fred Hu
(74) *Attorney, Agent, or Firm* — Santangelo Law Offices, P.C.

(57) ABSTRACT

Method and apparatus for hand imaging having an enclosure having an opening into a concealed interior space or hand imaging area wherein the hand of a user is placed on a wrist pad to assure proper positioning. The charge-coupled device (CCD), its lens and/or its sensor(s) above the hand imaging area are arranged in a biangular manner to achieve a 3D representative image of the hand. Effective lighting is shown on the upper side of the of the enclosure which may be a light emitting diode (LED) or like light source. Also shown is a side angle mirror or a second CCD along with an indicator light (or ready light) for indicating that the device is ready for use. Also shown is means for connecting the device to a computer or like central data processing unit for providing a power supply and computer connectivity. This provides a method for generating hand images of a user to authenticate the identity of the user by generating a first series of confidential images of the hand of the user; wherein said plurality of first images comprises a plurality of first hand signs; storing the first images whereby a base record of the first images is compiled in a computer; generating a second series of confidential images of the hand of the user; wherein said plurality of second images comprises a plurality of second hand signs; and, comparing the plurality of second images to the base record whereby the identity of the user is authenticated.

20 Claims, 7 Drawing Sheets

(56) References Cited

U.S. PATENT DOCUMENTS

| | | | |
|---|---|---|---|
| 2006/0034492 A1* | 2/2006 | Siegel | G06F 1/1601 382/115 |
| 2007/0064986 A1* | 3/2007 | Johnson | G08B 21/245 382/128 |
| 2008/0002861 A1* | 1/2008 | Yano et al. | 382/115 |
| 2010/0060570 A1* | 3/2010 | Underkoffler et al. | 345/156 |
| 2010/0085147 A1* | 4/2010 | McCall | 340/5.72 |
| 2012/0268364 A1* | 10/2012 | Minnen | 345/156 |

OTHER PUBLICATIONS

Ang Lee; anglee.org/proj/ASL/ASL.jpg.

Optics Report, LLC; Biometrics: Your fingers, face, and eyes in a whole new light.

Wikipedia; Manually Coded English.

\* cited by examiner

METHOD AND APPARATUS FOR HAND IMAGING DEVICE

RELATED APPLICATIONS

This application claims benefit of U.S. Provisional Patent Application Ser. No. 61/206,492 filed on Jan. 30, 2009.

BACKGROUND OF THE INVENTION

1. Field of the Invention

The present invention relates generally to security devices and, more particularly, is concerned with an apparatus and method for a hand imaging security device.

2. Description of the Prior Art

Methods related to the present invention have been described in the prior art; however, none of the prior art devices disclose the unique features of the present invention. The innovative quality of the present invention is easily illustrated when a comparison to current methods is made. Patent searches and media sources indicate there is a trend in computer systems security to rely on biometric means of identification. One patent in particular; U.S. Pat. No. 6,256,737 states in its abstract that "the definition of scientific technique utilized by biometric devices, is to identify the user based on comparison of unique personal characteristics". The afore mentioned patent then lists a set of biometric measurements that claim to define what types of biometric traits are suitable for identification purposes. Logic dictates by that patents' own definition of method, that the biometric object that is being measured must be a unique identifier in order to be useful. In other words the same type of measurement taken from two different subjects should not match. This key point is how the present invention demonstrates a different strategy and shows how the core concept of the present invention is in fact innovative. The present invention does not rely on an absolute measurement of any specific body part in the sense that the measurement taken of that body part becomes the absolute calibration for further measurement of that particular body part as an object in comparison to the original measurement taken—the original measurement being the control and absolute calibration for further measurements taken of that body part by the same technique and means of measurement as the original. In example when a retina is scanned for personal identification and or authentication, that retinal scan becomes the ruler by which all other scans taken of that retina are compared, the retina is simply an object used in the calibration of future measurements of itself. The present invention relies on the active intention of the user to enable the process of authentication. The present invention is not biometric in the sense that U.S. Pat. No. 6,256,737 describes because the user must be conscience of their identification and intend to enable authentication. The present invention is also not merely an alphanumerical key because the user must be present for authentication. The fact that the user must be present, and their hand is used in the creation and subsequent recreation of a hand sign for authentication does not mean that the measurement taken is absolutely biometric, the user must also actively intend to be identified by the recreation of the correct hand signs in proper succession. While the prior methods mentioned; in U.S. Pat. No. 6,256,737—pertaining to biometric measurement, or with the method of alphanumerical identification may be suitable for the purposes for which they were designed, they would not be as suitable for the purposes of the present invention, as hereinafter described.

SUMMARY OF THE PRESENT INVENTION

The purpose of the present invention is to provide an increased level of security by controlling who has access to networks, assets and restricted areas by means of computer controls and/or by human inspection. The present invention is a computer hardware device and method. Its intended use is to facilitate a confidential interface between the human hand and a computer system in order to conduct user authentication. The method by which authentication is achieved involves the creation of a series of user hand signs, to be stored in computer memory along with a unique alphanumeric user identification code. The user authentication may then occur by entering the user identification code followed by the correct series of hand signs. The correct series of hand signs must then be verified.

The core concept of the present invention is that it allows unseen hand signs created by the unique thoughts of the individual to be used as a key for authentication. From a physical perspective, the device is a three dimensional (3D) imaging apparatus that is used to identify the positioning and posing of a human hand. The 3D images are obtained using either one sensor, or an array of sensors that provide a composite digital representation of the hand signs and the void around them. At this point, a baseline record is recorded and stored using typical computer file or database storage technology. The baseline record is comprised of two or more of the following: 1) A digital image; 2) A digital signature derived from software analysis of the digital image; 3) One or more stored control values derived from analysis of the digital image; or 4) An alphanumeric user identification code.

This method has the advantage of integrating the hand signs with traditional alphanumeric keys to be used for user authentication. This quality does not, however, indicate a weakness or vulnerability in the system for two reasons. First, an individual is the only one who knows his hand signs, and second a minimum number of hand signs combined with an alphanumeric user identification code, will significantly decrease the probability that a false positive authentication will occur. The strength of this method is achieved by creating an alternative type of password security. The method thwarts hacking attempts by unintended users through combining authentication techniques. A common method of hacking known as a brute force attack, involves hitting a secured system with several iterations of prescribed groups of randomly created alphanumeric characters in successive attempts at penetrating the secured systems' password protections. The method created by the present invention complicates possible attempts by the above mentioned hacking method.

An object of the present invention is to increase the level of security and protect the intended anonymity of the user during authentication. It has a user friendly quality that allows the login transaction to occur safely, quietly, unseen by others, in a timely and natural way. The device features a concealed area in which a user can input his hand signs while maintaining complete confidentiality between himself and those around him. A key requirement is that identical versions of the device will produce very similar but not completely identical images of the same hand sign made by the same user. It also features uniform lighting of the hand which is necessary to produce consistent images. Different versions of the device may be produced in sets for specific user groups. These different versions will achieve unique variations by using different combinations of lighting and charge-coupled devices (CCD) and/or sensor spectrums. They may also use different lenses, focal lengths and CCD and/or sensor angles to produce the variations. They may also utilize a different total number of CCD and/or sensors. Variations in the characteristics of a given set of devices help personalize that particular set of devices specifically for a given user group.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT(S)

Figure 1:
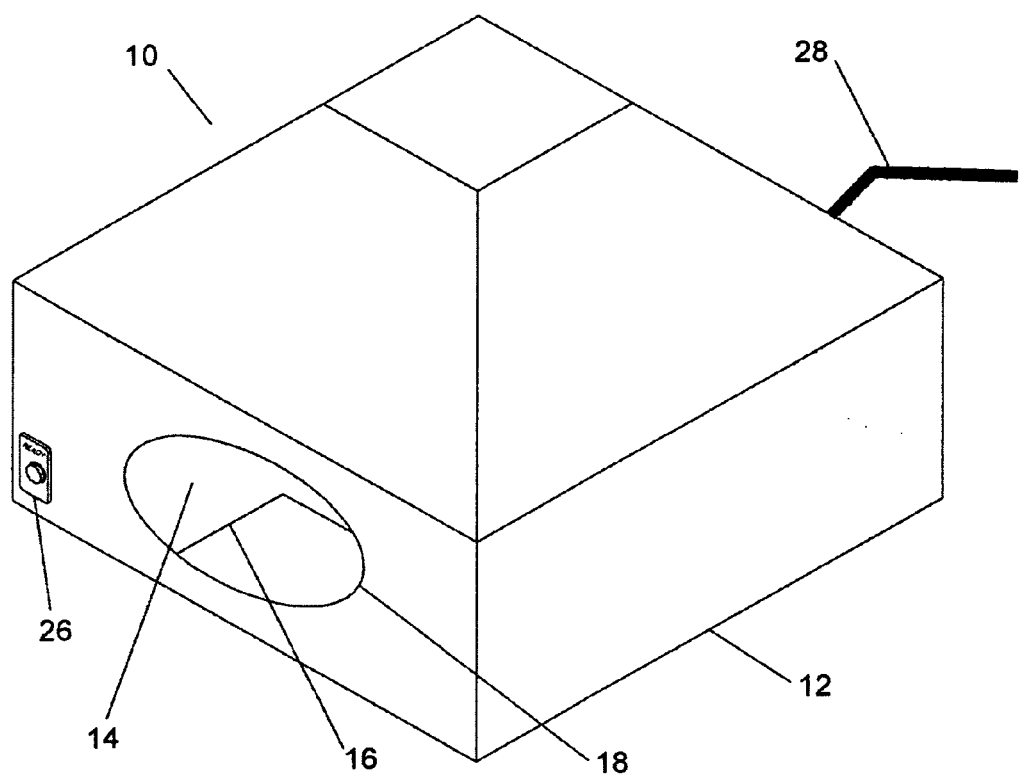
FIG. 1 is a perspective view of the present invention.
Figure 2:
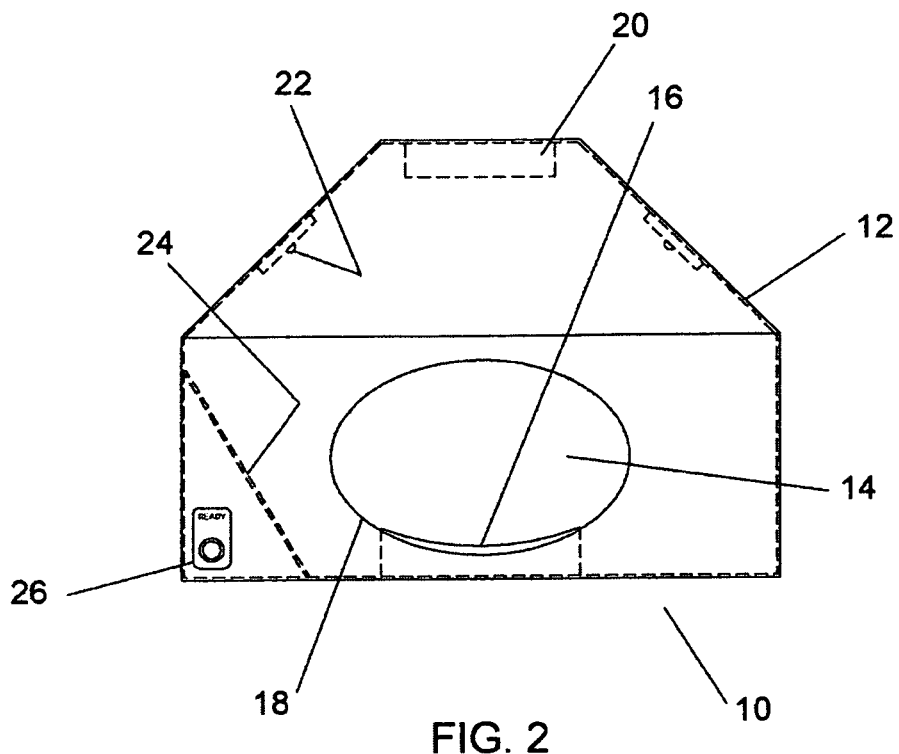
FIG. 2 is a front elevation view of the present invention.
Figure 3:
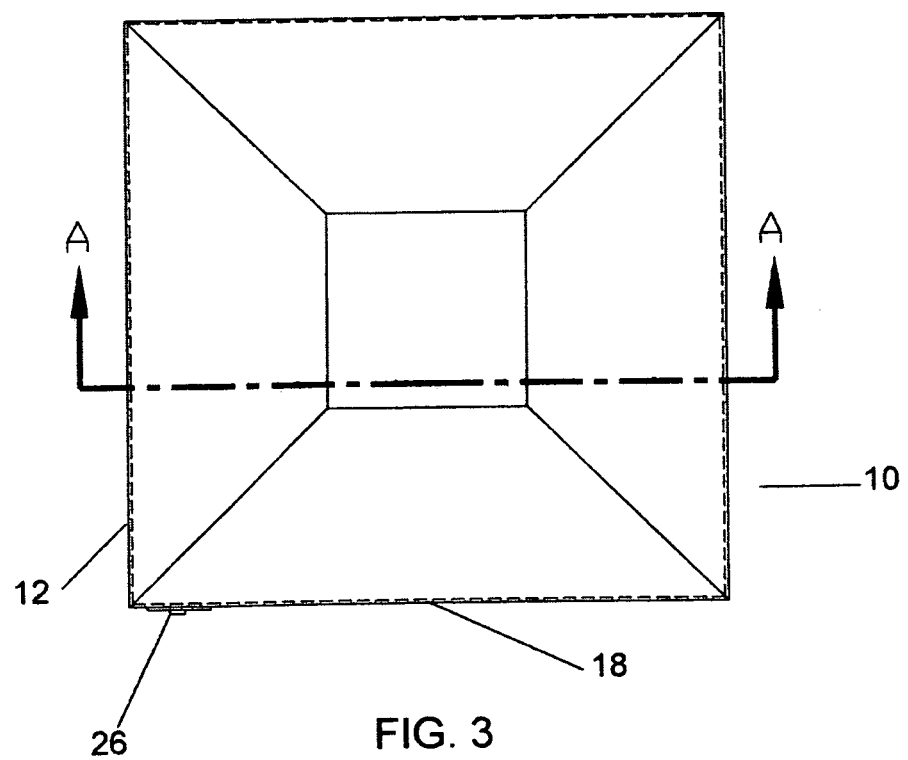
FIG. 3 is a plan view of the present invention.
Figure 4:
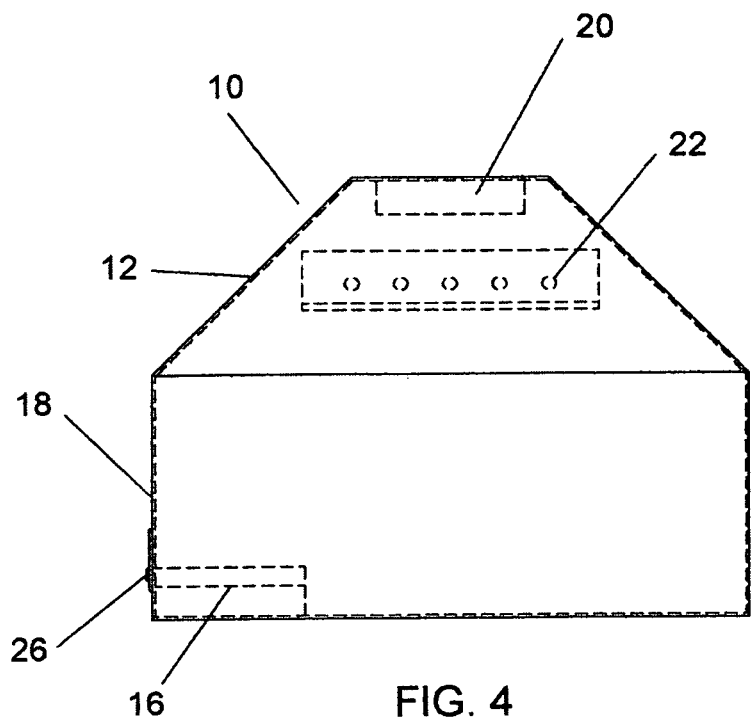
FIG. 4 is a side elevation view of the present invention.
Figure 5:
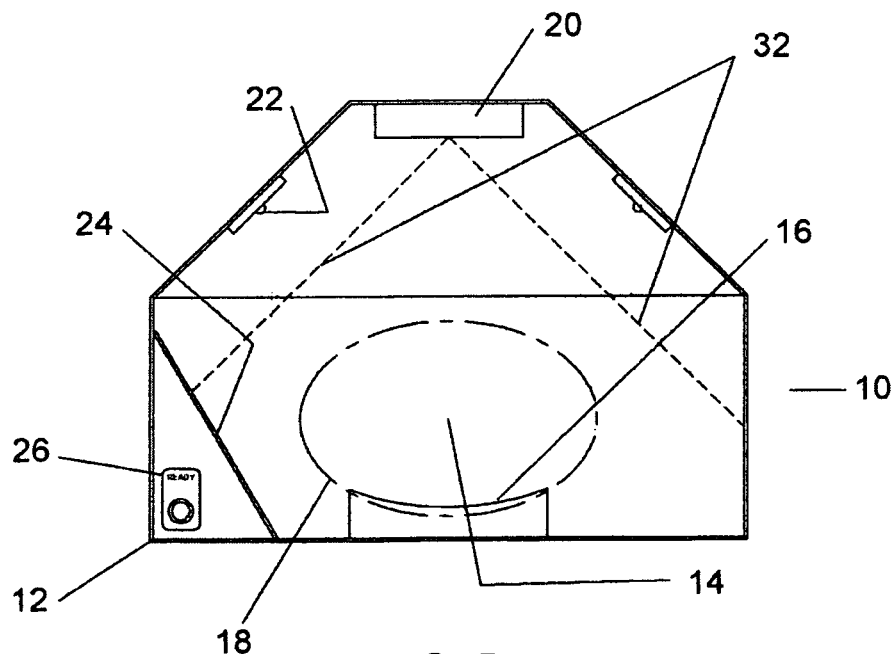
FIG. 5 is a cross-sectional view taken from FIG. 3 of the present invention.

The following discussion describes in detail at least one embodiment of the present invention. This discussion should not be construed, however, as limiting the present invention to the particular embodiments described herein since practitioners skilled in the art will recognize numerous other embodiments as well. FIGS. 1 through 9 illustrate the present invention wherein a method and apparatus for hand imaging is disclosed.

Turning to FIGS. 1-5, shown therein is the present invention 10 having an enclosure 12, being any appropriate shape and size, having an opening 18 into a concealed interior space or hand imaging area 14 wherein the hand of a user is placed on a wrist pad 16 to assure proper positioning. The charge-coupled device (CCD), its lens and/or its sensor(s) 20 is shown above the hand imaging area 20 arranged in a biangular manner shown by light rays at 32 to achieve a 3D representative image of the hand. Effective lighting 22 is shown on the upper side of the of the enclosure 12 which may be a light emitting diode (LED) or like light source. Also shown is a side angle mirror or a second CCD 24 along with an indicator light (or ready light) 26 for indicating that the present invention 10 is ready for use. Also shown is means for connecting 28, e.g., IEEE 1394, USB or the like, the present invention 10 to a computer or like central data processing unit for providing a power supply and computer connectivity.

Figure 6:
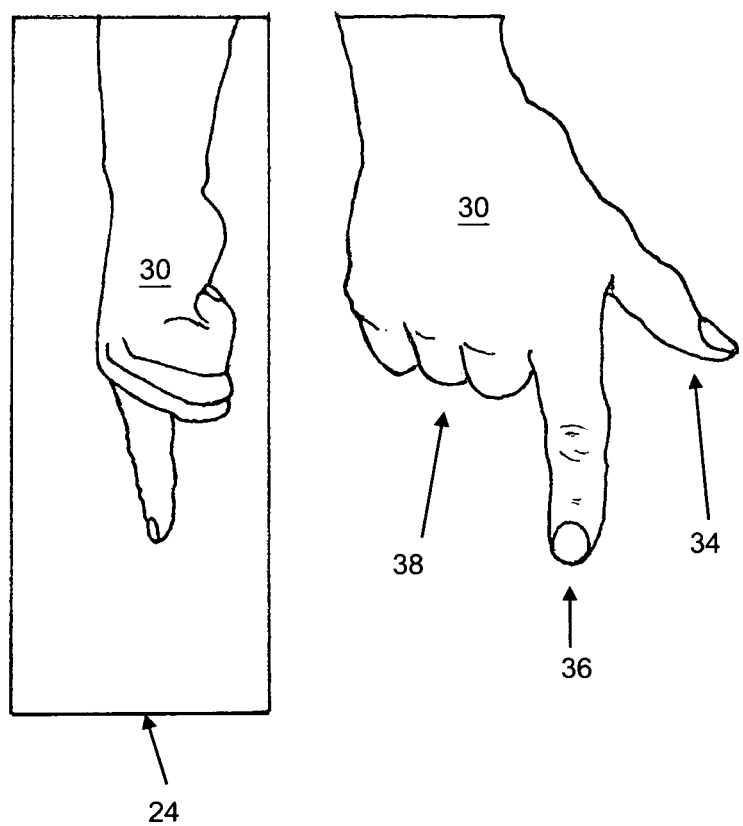
FIG. 6 is a view of an exemplary hand of a user of the present invention.

Turning to FIG. 6, therein is shown a hand 30 forming an exemplary hand sign along with a side mirror 24 which is reflecting the side image of the hand. Also shown are the extended thumb 34, extended index finger 36 and folded fingers 38 to form a hand sign. The illustrated exemplary hand sign is merely a first with the index finger and thumb being extended wherein the palm of the hand is oriented toward the down side. Many other hand signs could be used, e.g., the familiar rock, paper and scissors signs as used in the game of the same name.

A charge-coupled device (CCD) is a silicon chip containing an array of light-sensitive diodes, used for capturing images. The photodiodes, arranged in an array of rows and columns, become charged when light falls on them. Images are electronically formed using a layer of silicon that releases electrons when struck by incoming light. The amount of charge depends on the amount of light, which may be built up over time. The electrons are stored in pixels read off into a computer at the end of the exposure. These charges are read out column by column to provide an analogue signal of the image on the array, which is then converted to digital form for display and storage on a computer. CCDs are widely used both by professional and amateur astronomers as they are more sensitive to light than a photographic emulsion, give an output in almost constant proportion to the amount of light falling on them (i.e. a linear response), and have no reciprocity failure. The image can be displayed almost immediately after the end of the exposure, and image processing can be used to enhance it. However, the detector area is much smaller than a photographic plate or film, which can be of any size required and provides much finer resolution.

Figure 7:
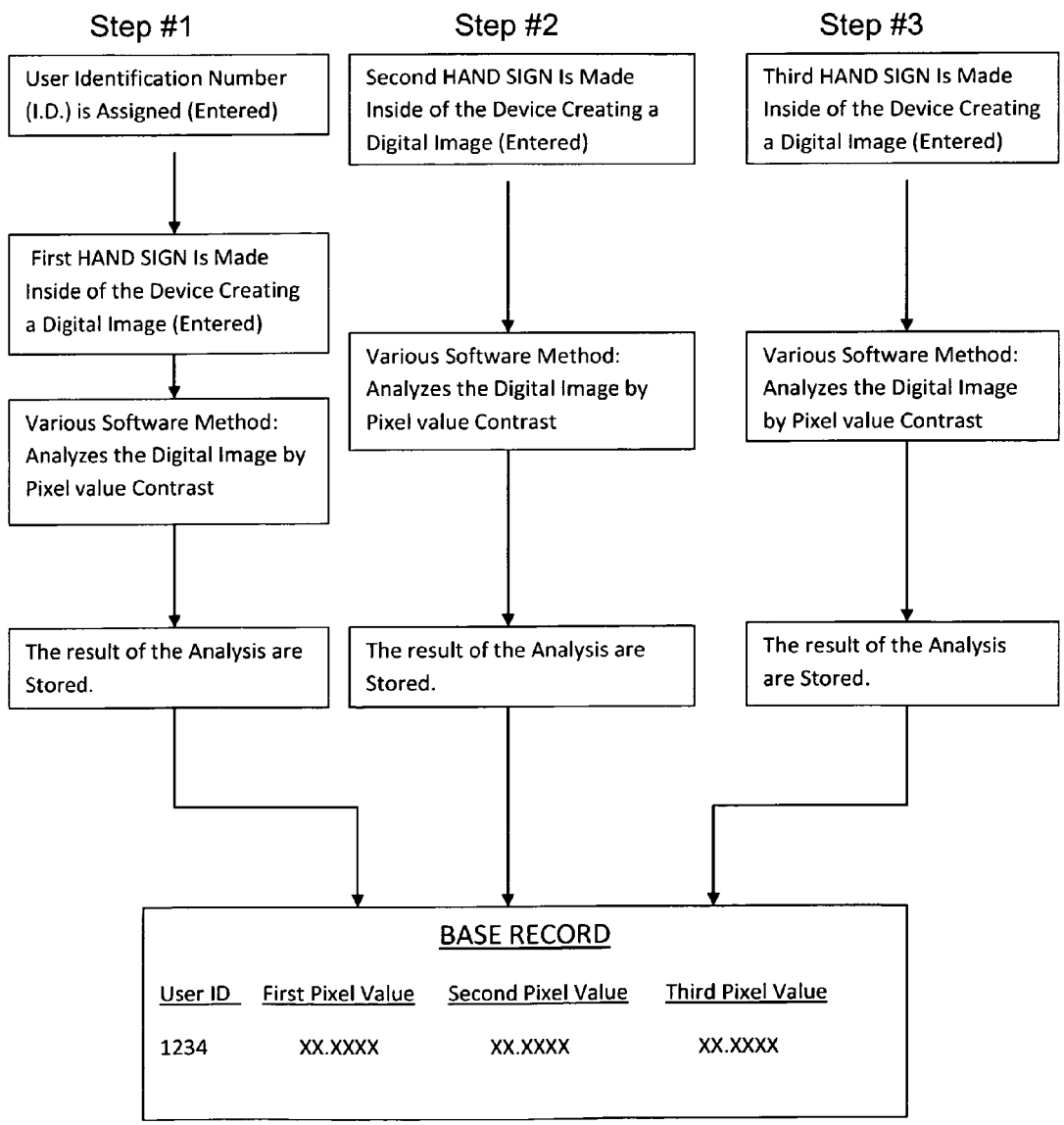
FIG. 7 is a flow chart of portions of the present invention.
Figure 8:
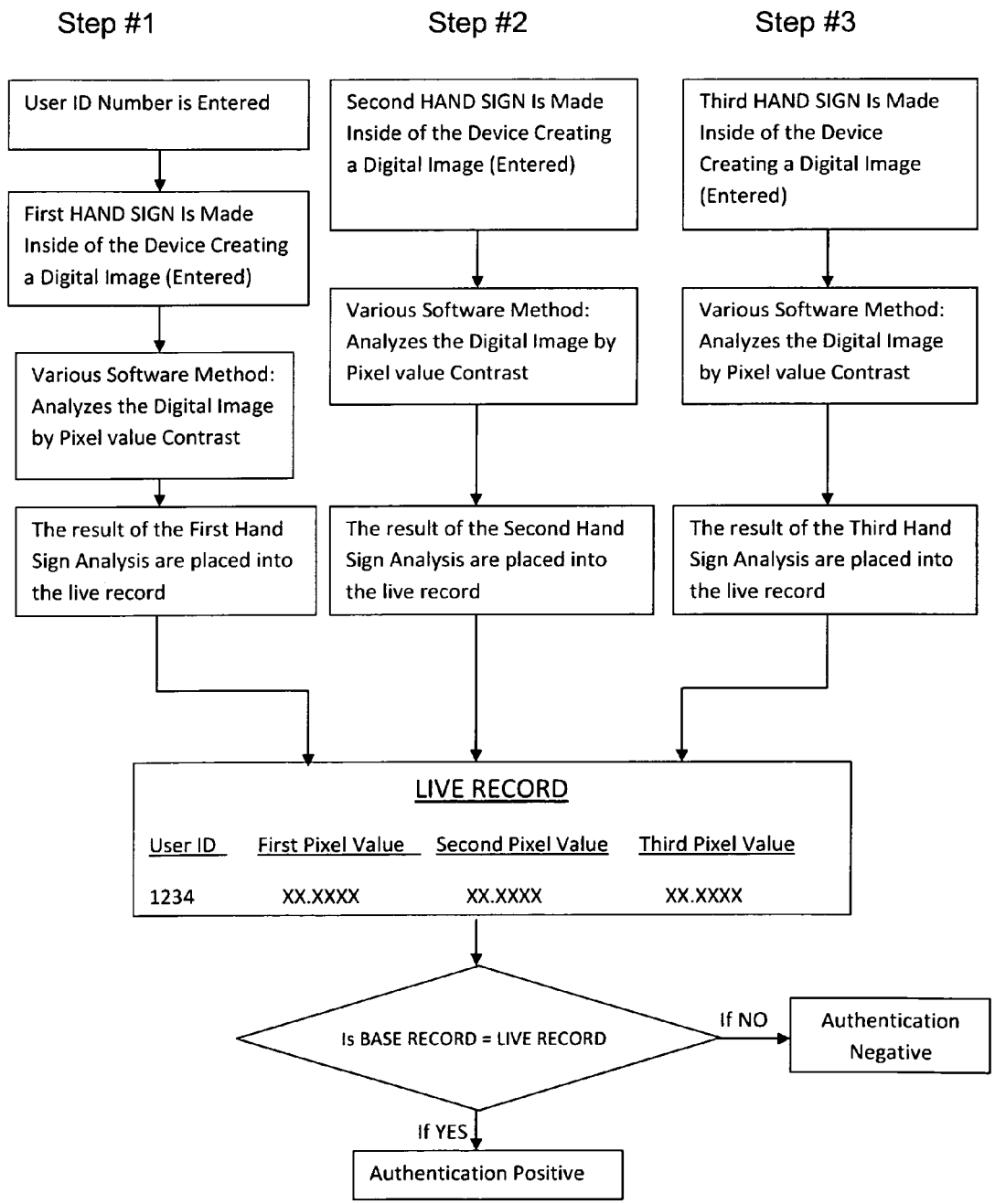
FIG. 8 is a flow chart of portions of the present invention.

Turning to FIGS. 7-8, therein is shown flowcharts showing in FIG. 7 the Base Record Process and in FIG. 8 the Live Record Process to better describe the operation of the device. Also listed below are important features of the present invention.

The hand imaging apparatus of the present invention features: 1) Concealed Area (allows confidential hand sign entry); 2) Uniform Lighting (facilitates consistent imaging); 3) Uniform Focal Point (facilitates consistent imaging); 4) Biangular Imaging (increases accuracy and differentiation); 5) Lightweight (portable); and, 6) Open Systems Interconnectivity (OSI) Compatible (standard connector).

This system for using hand images of a user to authenticate the identity of the user, may be summarized as follows: a first means for producing images whereby a plurality of first images of the hand of the user are produced; wherein said plurality of first images are made in a concealed area, are known only to the user, i.e., are secret, and comprise a plurality of first hand signs; means for storing said first images whereby a base record of said first images is compiled in a computer; a second means for producing images whereby a plurality of second images of the hand of the user are produced; wherein said plurality of second images comprises a plurality of second hand signs; and, means for comparing said plurality of second images to said base record whereby the identity of the user is authenticated.

The method of the present invention features: 1) Multiple Stationary Hand Signs (produces unique repeatable combinations; 2) Personal Creation of Hand Signs (insures uniqueness and security); and, 3) User May Enter Signs Unobservable to Others (In the presence of persons).

Other features include: 1) Minimal Size Requirements for Records (reduces demands on memory); 2) Base Record Independence (ability to store and secure in Database); and, 3) System Log Capability (allows record of past user access).

Figure 9:
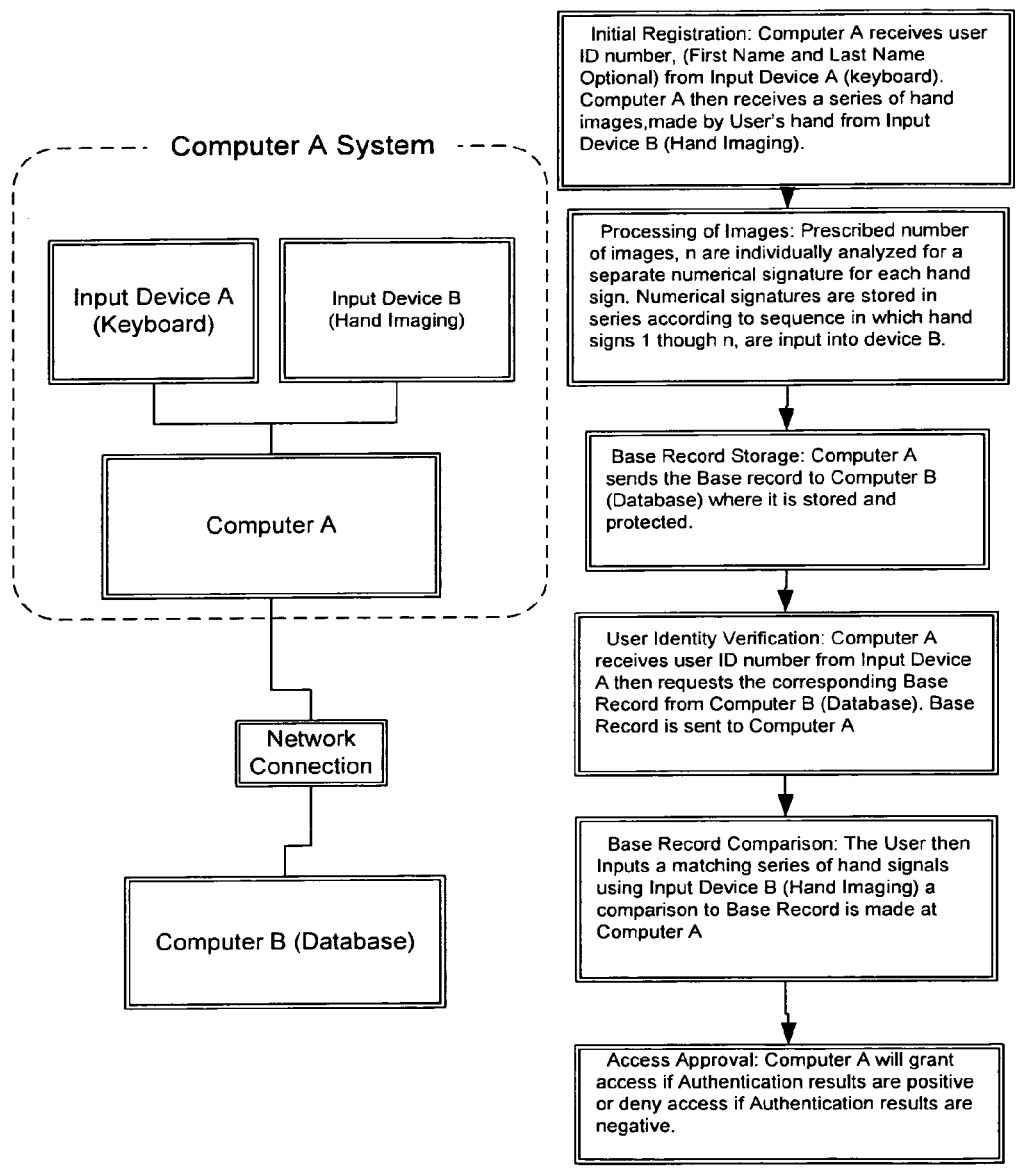
FIG. 9 is a schematic diagram/flow chart of portions of the present invention.

Turning to FIG. 9, therein is shown a schematic diagram/flowchart of the operation of the present invention showing the operational flowchart for a typical user authentication access system (hand imaging) of the present invention. Input Device B in FIG. 9 generally refers to the present invention.

By way of further general explanation of the present invention, the method of using the present invention follows: A person (user) places one hand inside of a computer controlled device which features a concealed compartment in the form of the hand imaging area 14 (not shown, see FIG. 5). Once the hand is inside of the device a series of confidential hand signs, as exemplarily illustrated in FIG. 6, are made. A digital representation of the positioning and posing of the hand is then sent to the computer as an output of the device. The output is then placed and stored into a base record for the purpose of identifying the individual user by comparison. The device may then be used at a future time to allow the user to input the same series of hand signs in order to match the base record. The comparison of the digital representations may be made by human inspection of an on screen display, or by a computer software program. The core concept of this method is to identify a person by examination of the unique hand signs made by the individual user, rather than an examination of features of the hand itself. It is believed that the use of three hand signals at a maximum would be sufficient to allow substantially positive identification or authentication of the user.

A statistical evaluation of the present invention has been conducted and is summarized as follows: The experimental probability from our collected data of eight users compared to a user's three hand signs can be stated as being 95% certain that the user's new hand signs will match his own—but the certainty that one of eight subjects matched against a user gains access is described below.

The first entry used in a typical base record example is the User Identification Code. The possibility of guessing a user's I.D. code number depends upon the length of the code. A useful PIN code length for User ID is made up of a minimum of 4 digits ranging from 0-9, with replacement. (The same digit can be selected more than once) 10×10×10×10=10,000 combinations are possible.

$$1/10,000 \times (\text{Probability of } 1^{st} \text{ Hand Sign Match}) \times (\text{Probability of } 2^{nd} \text{ Hand Sign Match}) \times (\text{Probability of 3rd Hand Sign Match}) = \text{Total Probability of a False Positive Authentication.}$$

To develop the probability that a person would get a false positive for a single hand sign, we used our experimental data with 8 different people giving 3 different hand signs each, and then each hand sign matched against a user's 3 control hand signs. The total number of data points obtained was 216 for this experiment. The total number of false positives was 36. This means that there is a 36/216, or 16.7% chance that someone will get one false positive for either the Top, Side or Top—Side views within the analysis of a single hand sign. That number is brought to the third power to determine the probability that a false positive will be made for a single hand sign, or a 0.463% chance that a single hand sign will get false positive recognition in all three views. Because we require the user to log in three hand signs, 0.463% is then brought to the power of 6, or to the power of three for each hand sign having three views each to determine the probability that all 9 aspects are accepted falsely: 36/216 to the power of 9= $(36/216)^{\wedge}9$=approximately 3.9E8/3.9E15 or 1/10,000,000 (one in ten million).

As stated above, with a 4 digit numerical code as well as the hand signs, the probability of a false positive becomes 1/10,000×(Probability of $1^{st}$ Hand Sign Match)×(Probability of $2^{nd}$ Hand Sign Match)×(Probability of 3rd Hand Sign Match)=(1/10,000)×(1/10,000,000)=1/100,000,000,000 (one in one hundred billion).

What is claimed is:

1. A method of user identification by hand imaging, comprising the steps of:
    a) placing the hand of a user within a space having at least a first sensor and at least a second sensor for imaging the hand of the user;
    b) the user stationary posing the hand in at least one hand sign;
    c) simultaneously imaging the hand of the user with at least said first sensor and said second sensor to produce, for each said hand sign stationary posed by the user, at least a first image of said hand sign and at least a second image of said hand sign;
    d) for each said at least first image and each said at least second image, conducting a pixel contrast value analysis of that image to independently produce for that image a numerical pixel contrast value based on the specific hand sign of that image;
    e) deriving a numerical digital signature capable of identifying the user to a statistical certainty having a series of said independently produced numerical pixel contrast values based on the sequence in which the user stationary posed the hand in at least one hand sign;
    f) increasing accuracy and differentiation of said numerical digital signature by utilizing at least two said independently produced numerical pixel contrast values for each hand sign corresponding to said at least first image and said at least second image of said hand sign;
    g) minimizing size requirements for records with said numerical pixel contrast values and said numerical digital signature;
    h) forming a baseline record identifying the user from said numerical digital signature.

2. The method of claim 1 wherein said space comprises an enclosed space, wherein said step of stationary posing comprises the step of concealing the hand of the user within the enclosed space, wherein said first sensor comprises a CCD situated above the hand of the user, wherein said second sensor comprises a side angle mirror located along a side of the enclosed area for reflecting a side image of the hand, and further comprising a light source of LED's located above the side mirror along a side of the enclosed area.

3. The method of claim 1 wherein said first sensor comprises a sensor selected from the group consisting of a sensor having a direct view of said hand of said user, a CCD, a lens, a mirror, a spectrum sensor, and a digital sensor, and wherein said second sensor comprises a sensor selected from the group consisting of a sensor having a reflected view of said hand of said user, a CCD, a lens, a mirror, a spectrum sensor, and a digital sensor.

4. The method of claim 1 wherein said step of user stationary posing the hand in at least one hand sign comprises the step of user stationary posing the hand in at least three hand signs.

5. The method of claim 1 wherein said step of imaging comprises the step of producing variations between said first image and said second image.

6. The method of claim 5 wherein said step of producing variations comprises a step selected from the group consisting of using different combinations of lighting, using different combinations of CCDs, using different combinations of spectrum sensors, using different lenses, using different focal lengths, using different CCD angles, using different sensor angles, and using biangular imaging.

7. The method of claim 5 wherein said step of deriving a singular digital signature comprises the step of using said produced variations between said first image and said second image.

8. The method of claim 1 wherein said step of forming a baseline record comprises the step of using an alphanumeric user identification code provided by said user.

9. The method of claim 1 further comprising the steps of identifying a subsequent user by the subsequent user engaging in said steps and authenticating the subsequent user by comparing the baseline record identifying the subsequent user with the baseline record identifying the user.

10. A hand imaging user identification apparatus comprising:
   a) a user hand placement space configured to permit stationary posing of the user's hand in at least one posed hand sign;
   b) at least a first sensor and at least a second sensor configured to simultaneously produce, for each said hand sign stationary posed by the user, at least a first image of said hand sign and at least a second image of said hand sign;
   c) a pixel value contrast analysis processor configured to independently produce, for each said at least first image and each said at least second image, a numerical pixel contrast value based on the specific hand sign of that image;
   d) a numerical digital signature derivation processor configured to derive a numerical digital signature utilizing a series of said independently produced numerical pixel contrast values based on the sequence in which the user stationary posed the hand in at least one hand sign;
   e) a numerical digital signature accuracy and differentiation processor configured to increase accuracy and differentiation of said numerical digital signature by utilizing at least two said independently produced numerical pixel contrast values for each hand sign corresponding to said at least first image and said at least second image of that hand sign;
   f) a numerically-minimized record size memory configured to store records having numerically-minimized size requirements from said numerical pixel contrast values and said numerical digital signature;
   g) computer storage configured to store a baseline record identifying said user formed from said numerical digital signature;
   h) a user identification processor configured to utilize said numerical digital signature to identify the user to a statistical certainty.

11. The apparatus of claim 10 wherein said user hand placement space comprises an enclosed space configured to conceal the hand of the user, wherein said first sensor comprises a CCD situated above the hand of the user, wherein said second sensor comprises a side angle mirror located along a side of the enclosed area for reflecting a side image of the hand, and further comprising a light source of LEDs located above the side mirror along a side of the enclosed area.

12. The apparatus of claim 10 wherein said first sensor comprises a sensor selected from the group consisting of a sensor having a direct view of said hand of said user, a CCD, a lens, a mirror, a spectrum sensor, and a digital sensor, and wherein said second sensor comprises a sensor selected from the group consisting of a sensor having a reflected view of said hand of said user, a CCD, a lens, a mirror, a spectrum sensor, and a digital sensor.

13. The apparatus of claim 10 wherein said user hand placement space comprises a user hand placement space configured to permit stationary posing of the user's hand in a sequence of at least three hand signs.

14. The apparatus of claim 10 wherein said first sensor and said second sensor comprise sensors configured to produce variations between said first image and said second image simultaneously produced for said hand sign.

15. The apparatus of claim 14 wherein said sensors configured to produce variations comprise sensors selected from the group consisting of sensors configured to use different combinations of lighting, sensors configured to use different combinations of CCDs, sensors configured to use different combinations of spectrum, sensors configured to use different lenses, sensors configured to use different focal lengths, CCDs configured to use different angles, sensors configured to use different angles, and sensors configured to use biangular imaging.

16. The apparatus of claim 14 wherein said numerical digital signature derivation processor comprises a processor configured to derive said numerical digital signature using said produced variations between said first image and said second image.

17. The apparatus of claim 10 wherein said computer storage configured to store a baseline record identifying said user further comprises an alphanumeric user identification code entry.

18. The apparatus of claim 10 wherein said apparatus comprises an apparatus configured for use by a subsequent user and further comprising a subsequent user authentication processor configured to compare a baseline record identifying the subsequent user with the baseline record identifying the user.

19. The method of claim 4 wherein said statistical certainty comprises no greater than a 1 in 10 million chance of obtaining a false positive from said numerical digital signature.

20. The apparatus of claim 13 wherein said statistical certainty comprises no greater than a 1 in 10 million chance of obtaining a false positive from said numerical digital signature.

* * * * *